A. D. FOUCART.
ELASTIC TIRE WHEEL.
APPLICATION FILED NOV. 7, 1907.
906,404.
Patented Dec. 8, 1908.
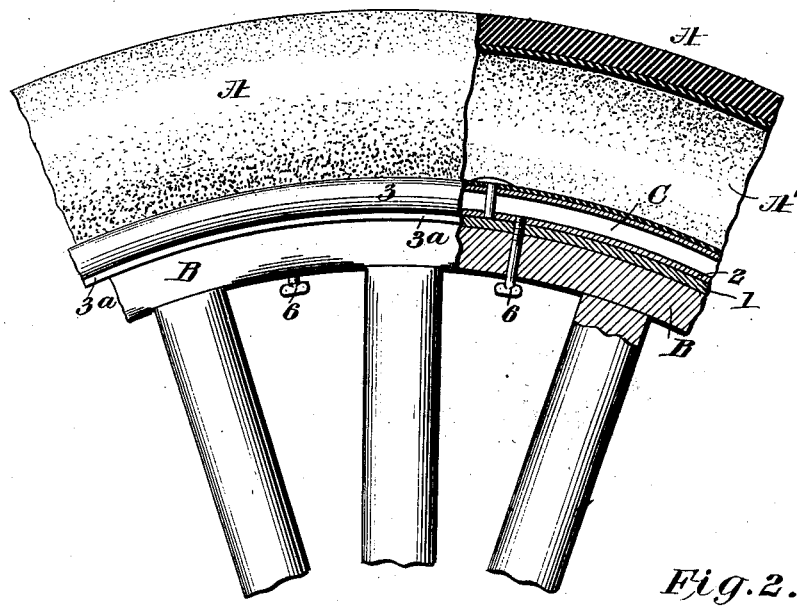
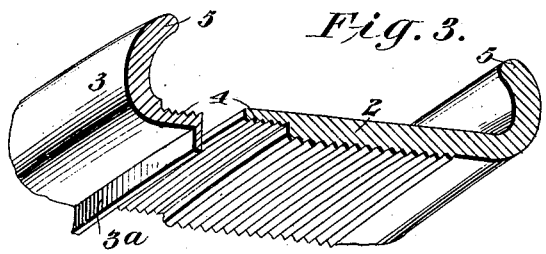
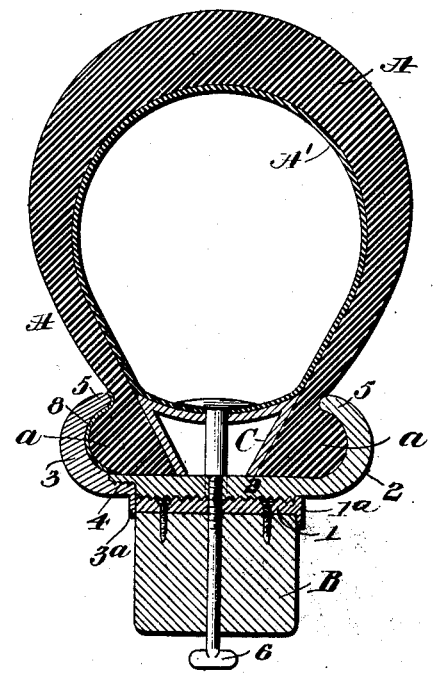
WITNESSE
Samuel E. Wade
Amos W Hart
INVENTOR
AUGUSTUS D. FOUCART
BY Munn & Co.
ATTORNEYS

UNITED STATES PATENT OFFICE.

AUGUSTUS D. FOUCART, OF MUNCY, PENNSYLVANIA.

ELASTIC-TIRE WHEEL.

No. 906,404.      Specification of Letters Patent.      Patented Dec. 8, 1908.

Application filed November 7, 1907. Serial No. 401,100.

*To all whom it may concern:*

Be it known that I, AUGUSTUS D. FOUCART, a citizen of the United States, and a resident of Muncy, in the county of Lycoming and State of Pennsylvania, have made certain new and useful Improvements in Elastic-Tire Wheels, of which the following is a specification.

My invention is an improvement in means for securing pneumatic and solid-rubber tires to the rims of wheels, particularly such as are intended for use on automobiles, bicycles, and traction engines.

The means I employ enable the elastic tire to be readily applied or detached and yet holds the same securely.

The details of construction, arrangement and combination of parts are as hereinafter described, and illustrated in the accompanying drawing, in which—

Figure 1 is a view in side elevation and partly in section of a portion of a vehicle wheel and pneumatic tire secured together by my improved means. Fig. 2 is an enlarged cross section of the wheel rim, the elastic tire, and the means for connecting them. Fig. 3 is a perspective view of a portion of the clencher, or clamping ring, constituting the main feature of my invention.

A indicates the thick outer rubber tube of a pneumatic tire and A' the inflatable tube commonly employed therewith.

C is a so-called locking-ring, which may be of any suitable construction and is applied in the usual way between the inner edges of the tube A.

My invention is embodied in the means now to be described for securing the elastic tire to the rim or felly of a vehicle wheel. An exteriorly threaded ring 1 having a flange 1ᵃ on one edge, extends around, and is secured to, the wooden rim B or B', and upon it is applied the clencher, or clamping ring, that secures the elastic tire thereto. This ring is formed in two parts designated, respectively, by numerals 2 and 3. It will be understood that both parts are of annular form, and, in practice, extend completely around the rim B, and the threaded ring 1. The part 2 is the broader or wider, and its inner side is screw-threaded whereby it is adapted to be screwed upon the ring 1 or on the felly or wheel rim B. The parts 2, 3, are provided with shouldered portions which are screw-threaded, as indicated at 4, Fig. 3, whereby they are adapted to be detachably connected, as shown in Fig. 2. Each of the parts 2, 3, is provided with an outwardly projecting inturned flange 5, which constitutes practically an annular hook adapted to clasp over and engage the beads a, which are formed on the edges of the outer tube A, see Fig. 2. It is apparent that when the part 2 shall have been screwed upon the threaded rim-ring 1, the other part 3 of the clencher ring may be attached thereto by rotating it so as to engage the screw threads 4. In Fig. 3 I show a ring threaded on the inner side so it may be screwed directly on the wheel rim B'.

It will be understood that the threads on the parts 1, 2, 3, and 4 are right and left. The threads may extend entirely around the circumference of the wheel, or may be single, double or sectional threads, the double thread starting at opposite points of the circumference of the wheel thereby facilitating the putting on or taking off of the tire or rim.

It will be further understood that the detachable part 3 of the clencher ring is preferably on the outside of the wheel, but may be on the inside. A screw 6, see Figs. 1 and 2, may be inserted through the wooden rim B and the clencher sections 1 and 2, for securing the parts together, so that there shall be no movement of one on the other or of part 1 on the rim. By the means described an elastic tire is held securely on the wheel rim B, but may be readily detached as occasion requires.

In order to prevent adhesion and undue friction between the clencher-ring section 3 and the adjacent bead a of the elastic tire, I apply a protective sheathing 8, constructed of sheet metal or thin sheet fiber, which in practice extends entirely around the wheel.

While my invention is shown in Figs. 1 and 2 as applied to the so-called clencher type of pneumatic tires, it is equally applicable to tires of the Dunlop type, in which the bases, or inner edges, of the thick tube are formed with annular beads wired to retain them in shape, the beads themselves having a lateral exterior projection, or being perfectly flat, as the case may be.

It will be understood that the clencher ring and the rim or ring that intervenes it and the wooden rim or felly of the wheel, are made of metal or a combination of metals.

I claim—

The combination, with an elastic tire, and a wheel rim, of a clencher ring formed of screw-threaded parts, one of which is also screw threaded on its inner side, an annular metal ring secured to said rim and which is threaded exteriorly and thus adapted for detachable connection with the clencher ring, and provided at one side with a flange 1ª overlapping the adjacent edge of the wheel rim proper, the exterior portion of the clencher ring having also an inwardly projecting flange 3ª which abuts the opposite side of the metal ring 1, and also overlaps the said wheel rim, substantially as described.

AUGUSTUS D. FOUCART.

Witnesses:
FRANK M. OPP,
N. H. FOUCART.